(12) United States Patent
Garner

(10) Patent No.: US 10,435,488 B2
(45) Date of Patent: Oct. 8, 2019

(54) SYSTEM AND METHOD FOR PROCESSING POLYMERIZATION REACTOR EFFLUENT

(71) Applicant: Bryan M. Garner, Alvin, TX (US)

(72) Inventor: Bryan M. Garner, Alvin, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 10 days.

(21) Appl. No.: 15/947,943

(22) Filed: Apr. 9, 2018

(65) Prior Publication Data

US 2018/0298119 A1 Oct. 18, 2018

Related U.S. Application Data

(60) Provisional application No. 62/486,157, filed on Apr. 17, 2017.

(51) Int. Cl.

| | |
|---|---|
| *B01D 3/06* | (2006.01) |
| *C08F 6/12* | (2006.01) |
| *B01D 50/00* | (2006.01) |
| *B01D 46/00* | (2006.01) |
| *B01J 8/00* | (2006.01) |
| *C08F 6/00* | (2006.01) |

(52) U.S. Cl.
CPC .......... *C08F 6/12* (2013.01); *B01D 3/06* (2013.01); *B01D 46/0056* (2013.01); *B01D 50/002* (2013.01); *B01J 8/006* (2013.01); *C08F 6/00* (2013.01)

(58) Field of Classification Search
USPC ........................................................ 528/501
See application file for complete search history.

(56) References Cited

U.S. PATENT DOCUMENTS

| | | |
|---|---|---|
| 3,152,872 A | 10/1964 | Scoggin et al. |
| 3,248,179 A | 4/1966 | Norwood |
| 3,941,664 A | 3/1976 | Scoggin |
| 4,424,341 A | 1/1984 | Hanson et al. |
| 4,501,885 A | 2/1985 | Sherk et al. |
| 4,588,790 A | 5/1986 | Jenkins, III et al. |
| 5,183,866 A | 2/1993 | Hottovy |
| 5,207,929 A | 5/1993 | Sung et al. |
| 5,352,749 A | 10/1994 | Dechellis et al. |
| 5,436,304 A | 7/1995 | Griffin et al. |
| 5,455,314 A | 10/1995 | Burns et al. |
| 5,565,175 A | 10/1996 | Hottovy et al. |
| 5,575,979 A | 11/1996 | Hanson |
| 6,239,235 B1 | 5/2001 | Hottovy et al. |
| 6,262,191 B1 | 7/2001 | Hottovy et al. |
| 6,833,415 B2 | 12/2004 | Kendrick et al. |
| 7,163,906 B2 | 1/2007 | McDaniel et al. |
| 7,332,543 B2 | 2/2008 | Follestad et al. |
| 7,381,777 B1 | 6/2008 | Towles et al. |
| 7,619,047 B2 | 11/2009 | Yang et al. |
| 7,790,820 B2 | 9/2010 | Jensen et al. |
| 7,960,487 B2 | 6/2011 | Yang et al. |
| 2012/0004489 A1 | 1/2012 | Mills et al. |

FOREIGN PATENT DOCUMENTS

| | | |
|---|---|---|
| CN | 202016966 U | 10/2011 |
| KR | 20030030757 A | 4/2003 |
| WO | 2001097940 A1 | 12/2001 |
| WO | 2009037080 A1 | 3/2009 |

OTHER PUBLICATIONS

International Search Report and the Written Opinion of the International Searching Authority in PCT/US2018/026655 dated Jun. 27, 2018, 11 pages.

*Primary Examiner* — Terressa Boykin

(57) ABSTRACT

A method of processing a polymerization reactor effluent stream comprising utilizing a separation system that removes greater than 99% of the fine polymer particles in the polymerization reactor effluent, wherein the separation system is a bag filter system, and wherein the bag filter is designed and operated to minimize the time required for shutdowns and equipment cleaning.

14 Claims, 2 Drawing Sheets

SYSTEM AND METHOD FOR PROCESSING POLYMERIZATION REACTOR EFFLUENT

CROSS-REFERENCE TO RELATED APPLICATIONS

This application claims the benefit of U.S. Provisional Application Ser. No. 62/486,157, filed on Apr. 17, 2017, the disclosure of which is incorporated herein by reference in its entirety.

FIELD OF THE INVENTION

This disclosure generally relates to a system for processing an effluent stream from a polymerization reaction process. Particularly, the disclosure relates to removing one or more undesired components and recycling one or more reusable components from a polymerization reaction effluent stream.

BACKGROUND OF THE INVENTION

The production of polymers such as polyethylene requires a high purity feedstock of various components, including monomers and co-monomers. In order to offset some of the costs and maximize production, it can be useful to reclaim and/or recycle some feedstock components from an effluent stream resulting from the polymerization reaction. To accomplish this, the reclaimed effluent streams have conventionally either been routed through a purification process or redirected through other redundant processing steps.

Conventional attempts to industrially produce high purity feedstock components have required the operation of a series of process equipment including a flash chamber, a cyclone, a filtration unit, multiple distillation columns, compressors, refrigeration units, and various other equipment. As such, the equipment and energy costs associated with feedstock purification represent a significant proportion of the total cost for the production of such polymers. Further, the infrastructure required for producing, maintaining, and recycling high purity feedstock represents a significant portion of the associated cost. In particular, the presence of small polymer particles in the effluent can cause problems in the downstream equipment used for effluent separation and purification. Therefore, it is important to remove essentially all solid polymer particles and polymer fines from the effluent stream after it leaves the polymerization reactor but before it is subjected to any further separation, recovery, or recycle.

BRIEF SUMMARY OF THE INVENTION

Disclosed herein is a method of treating a polymerization reactor effluent stream wherein the method comprises recovering the reactor effluent stream from the polymerization reactor, flashing the reactor effluent stream to form a flash gas stream, and passing the flash gas stream through one or more separation devices to remove polymer fines.

BRIEF DESCRIPTION OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1:
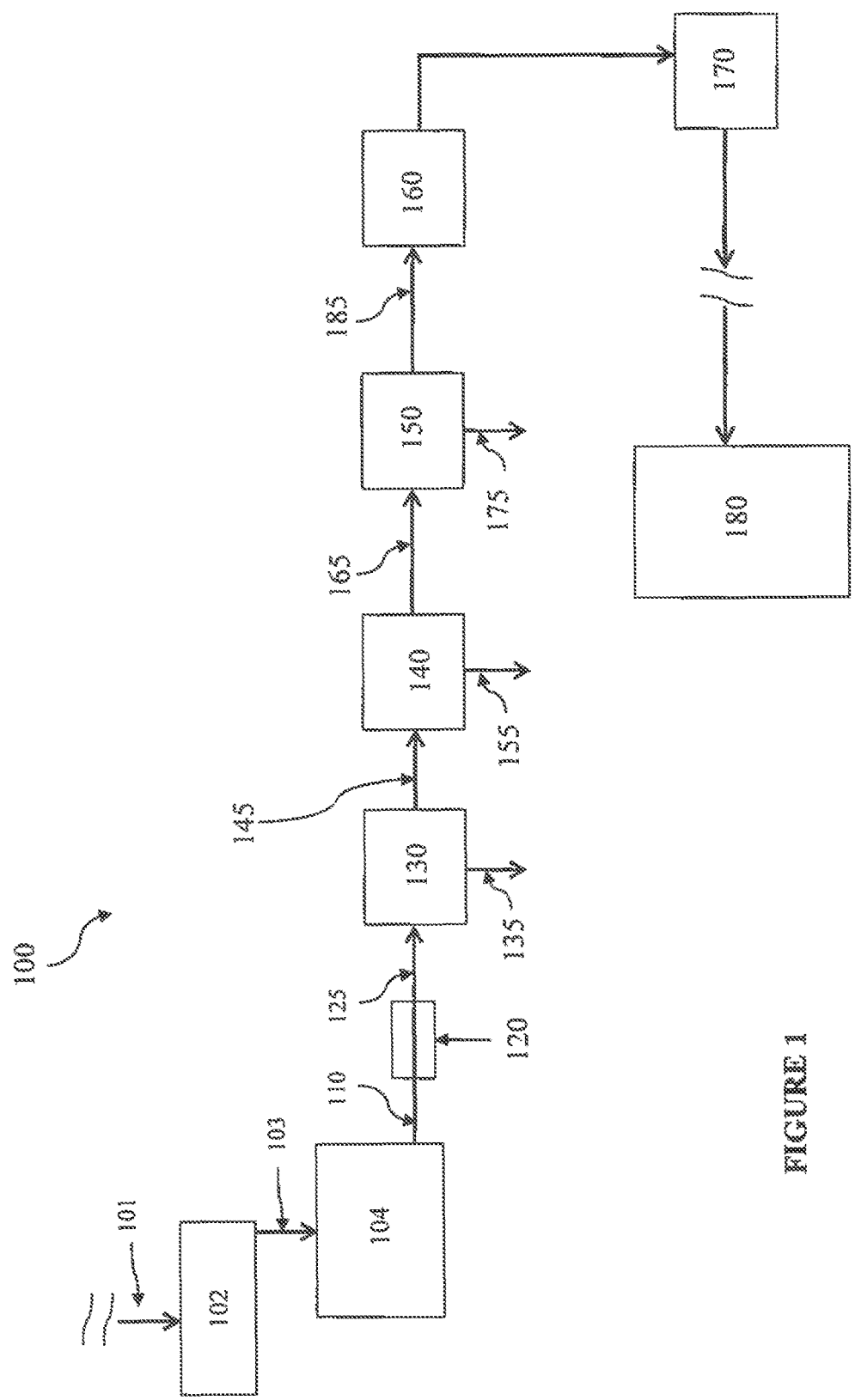
FIG. 1 illustrates a block diagram of a polyethylene polymerization system, according to an embodiment of the disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

Definitions

The following definitions are provided in order to aid those skilled in the art in understanding the detailed description of the present invention. Unless otherwise defined herein, scientific and technical terms used in connection with the present invention shall have the meanings that are commonly understood by those of ordinary skill in the art to which this invention belongs. Further, unless otherwise required by context, singular terms shall include pluralities and plural terms shall include the singular.

Unless explicitly stated otherwise in defined circumstances, all percentages, parts, ratios, and like amounts used herein are defined by weight.

Further in this connection, certain features of the invention which are, for clarity, described herein in the context of separate embodiments, may also be provided in combination in a single embodiment. Conversely, various features of the invention that are, for brevity, described in the context of a single embodiment, may also be provided separately or in any sub-combination.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about", the claims include equivalents to the quantities. The term "about" may mean within 10% of the reported numerical value, preferably within 5% of the reported numerical value.

As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but may include other elements not expressly listed or inherent to such composition, mixture, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

The term "contacting," as used herein, refers to the process of bringing into contact at least two distinct species such that they can react. It will be appreciated, however, that the resulting reaction product can be produced directly from a reaction between the added reagents or from an intermediate from one or more of the added reagents which can be produced in the reaction mixture.

The term "standard conditions," as used herein, refers to conditions of about 14.7 psi absolute and 60° F. (0.101 MPa absolute and 15.56° C.). The term "actual flow rate," as used here in, refers to the flow rate at the actual (specified) operating temperature and pressure. In accordance with nomenclature known to those of ordinary skill in the art, the abbreviation "scf" refers to "standard cubic feet," e.g., the volume (in cubic feet) of a gas at standard conditions.

DETAILED DESCRIPTION OF EMBODIMENTS

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Disclosed herein are various embodiments of systems, apparatuses, processes and methods related to polymerization reactions, particularly, polyethylene polymerization and the production of polyethylene and other polymeric olefins, such as polypropylene. The systems, apparatuses, and methods are generally related to a process for the separation and handling of the effluent stream from a polyethylene polymerization process.

Referring now to FIG. 1, a first polyethylene production (PEP) system 100 is illustrated. PEP system 100 generally comprises a purifier 102, reactor 104, a flash-line heater 120, a flash chamber 130, a flash gas cyclone 140, a filtration system 150, and a distillation system 160. In the PEP embodiments disclosed herein, various such system components can be in fluid communication via one or more conduits (e.g., pipes, tubing, or flow lines) suitable for the conveyance of a particular stream, for example as shown in FIG. 1 by the streams which are conveyed via such conduits. In alternative embodiments, the same or similar equipment and/or processes can be employed for the production of other polymeric materials, for example polypropylene, polybutylene, polyvinylchloride, or the like.

In the embodiment of FIG. 1, purifying the feed stream 101 in purifier 102 can yield a purified stream 103 comprising substantially pure monomers (e.g., ethylene monomers), as will be described herein. Polymerizing monomers of the purified stream 103 in the reactor 104 can yield an effluent stream 110 generally comprising unreacted ethylene, ethane, diluent (e.g., one or more of propane, propylene, isobutane, or n-butane), and a polymerization product (e.g., polyethylene). Heating the effluent stream 110 in flash-line heater 120 can yield a heated effluent stream 125. Separating the heated effluent stream 125 in flash chamber 130 can yield a polymer product stream 135 and a flash gas stream 145. Removing polymer fines from the flash gas effluent stream 145 in the flash gas cyclone 140 and the bag filter 150 can yield a substantially solids-free gas-phase reactor effluent stream as described by stream 185.

Various embodiments of suitable PEP systems having been disclosed, embodiments of a PEP process are now disclosed. One or more of the embodiments of a PEP process can be described with reference to PEP system 100. Although a given PEP process can be described with reference to one or more embodiments of a PEP system, such a disclosure should not be construed as so-limiting. Although the various steps of the processes disclosed herein can be disclosed or illustrated in a particular order, such should not be construed as limiting the performance of these processes to any particular order unless otherwise indicated.

In an embodiment, a feed stream is purified (e.g. at block 102). Purifying the feed stream can comprise separating unwanted compounds and elements from a feed stream comprising ethylene to form a purified ethylene feed stream. In embodiments illustrated by FIG. 1, purifying the feed stream can comprise routing the feed stream 101 to the purifier 102. In one or more of the embodiments disclosed herein, the purifier 102 can comprise one or more devices or apparatus suitable for the purification of one or more reactant gases in a feed stream which can comprise a plurality of potentially unwanted gaseous compounds, elements, contaminants, or the like. Non-limiting examples of a suitable purifier 102 in accordance with the present disclosure can comprise a filter, a membrane, a reactor, an absorbent, a molecular sieve, one or more distillation columns, fractionation columns, or combinations thereof. The purifier 102 can be configured to separate ethylene from a stream comprising methane, ethane, acetylene, propane, propylene, water, oxygen, other gaseous hydrocarbons, various contaminants, and/or combinations thereof.

In an embodiment, purifying a feed stream can yield a purified feed stream 103 comprising substantially pure ethylene. In an embodiment, the purified feed stream can comprise less than 25% by weight, alternatively, less than about 10% by weight, and in a further alternative, less than about 1.0% by weight of any one or more of nitrogen, oxygen, methane, ethane, propane, other hydrocarbons, or combinations thereof. As used herein "substantially pure ethylene" refers to a fluid stream comprising at least about 60% ethylene, alternatively, at least about 70% ethylene, alternatively, at least about 80% ethylene, alternatively, at least about 90% ethylene, alternatively, at least about 95% ethylene, alternatively, at least about 99% ethylene by weight, alternatively, at least about 99.5% ethylene by weight. In an embodiment, the purified feed stream 103 can further comprise trace amounts of ethane, e.g., less than about 0.5% ethane by weight.

In an embodiment, monomers of the purified feed stream 103 can then be polymerized (e.g., at block 104). Polymerizing monomers of the purified feed stream 103 can comprise facilitating a polymerization reaction between a plurality of monomers by contacting a monomer or two or more monomers with a catalyst system under conditions suitable for the formation of a polymer. A suitable catalyst system can comprise a catalyst and, optionally, a co-catalyst and/or one or more promoters. Non-limiting examples of suitable catalyst systems include but are not limited to Ziegler-Natta catalysts, Ziegler catalysts, chromium catalysts, chromium oxide catalysts, chromocene catalysts, metallocene catalysts, nickel catalysts, or combinations thereof. Catalyst systems suitable for use in this disclosure have been described, for example, in U.S. Pat. Nos. 7,619,047, 7,332,543, 7,790,820, 7,163,906, and 7,960,487, each of which is incorporated by reference herein in its entirety. In accordance with an embodiment of the present disclosure, any suitable catalyst system can be employed, as may be appropriate for a given process or product need or desire.

In the embodiment illustrated in FIG. 1, polymerizing monomers of the purified feed can comprise routing the purified feed stream 103 to the polymerization reactor 104. In one or more of the embodiments disclosed herein, the reactor 104 can comprise any vessel or combination of vessels suitably configured to provide an environment for a chemical reaction (e.g., a contact zone) between monomers (e.g., ethylene) and/or polymers (e.g., an active or growing polymer chain) in the presence of a catalyst to yield a polymer (e.g., a polyethylene polymer). Although the embodiment of FIG. 1 illustrates a PEP system having one reactor, one of skill in the art viewing this disclosure will recognize that two or more reactors arranged in any suitable configuration (e.g., in series and/or in parallel) can be employed, such as, for example, two or more loop reactors arranged in series and/or in parallel, or a loop reactor and a fluidized-bed reactor arranged in series or in parallel.

As used herein, the terms "polymerization reactor" or "reactor" include any polymerization reactor (e.g., a vessel) capable of polymerizing olefin monomers to produce homopolymers or copolymers. Such homopolymers and copolymers can be referred to as resins or polymers. The various types of reactors include those that are referred to as batch, slurry, gas-phase, solution, high pressure, tubular, or autoclave reactors. Gas phase reactors can comprise fluidized bed reactors or staged horizontal reactors. Slurry reactors can comprise vertical or horizontal loops, arranged singly or in series. High pressure reactors can comprise autoclave or tubular reactors, or combinations of autoclave and tubular reactors. Reactor types can include batch and/or continuous processes. Continuous processes can use intermittent or continuous product discharge. Processes can also include partial or full direct recycle of un-reacted monomer, un-reacted comonomer, and/or diluent.

Polymerization reactor systems of the present disclosure can comprise one type of reactor in a system. Alternatively, in an embodiment where multiple reactors are employed, two or more reactors can be of the same or different type. Production of polymers in multiple reactors can include several stages in at least two separate polymerization reactors interconnected by a transfer device or conduit making it possible to transfer the polymers resulting from the first polymerization reactor into the second reactor. The desired polymerization conditions in one of the reactors can be different from the operating conditions of the other reactor(s). Alternatively, polymerization in multiple reactors can include the transfer of polymer from a first reactor to a subsequent reactor(s) for continued polymerization. Multiple reactor systems can include any combination including, but not limited to, multiple loop reactors, multiple gas reactors, a combination of loop and gas reactors, multiple high pressure reactors or a combination of high pressure with loop and/or gas reactors. The multiple reactors can be operated in series or in parallel, or any combination thereof.

According to one aspect of this disclosure, the polymerization reactor can comprise at least one gas phase reactor. In an alternative aspect, the polymerization reactor can comprise at least one gas phase reactor in combination with at least one other reactor, which can be a slurry loop reactor or a solution polymerization reactor. Such systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790 and 5,436,304, each of which is incorporated by reference in its entirety herein.

According to another aspect of the disclosure, the polymerization reactor system can additionally comprise at least one loop slurry reactor comprising vertical or horizontal loops. Monomer, diluent, catalyst, and optionally any comonomer can be continuously fed to a loop reactor where polymerization may occur. Generally, continuous processes can comprise the continuous introduction of a monomer, a catalyst, and a diluent into a polymerization reactor and the continuous removal from this reactor of a suspension comprising polymer particles and the diluent. Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example of polymerization of propylene monomer is disclosed in U.S. Pat. No. 5,455,314, which is incorporated by reference herein in its entirety. A typical slurry polymerization process (also known as the particle form process), is disclosed, for example, in U.S. Pat. Nos. 3,248,179, 4,501,885, 5,565,175, 5,575,979, 6,239,235, 6,262,191 and 6,833,415, each of which is incorporated by reference in its entirety herein. In an embodiment, any suitable type, form, style, or combination of polymerization reactor or reactors can be employed in a given application.

According to yet another aspect of the disclosure, the polymerization reactor can comprise a solution polymerization reactor wherein the monomer is contacted with the catalyst composition by suitable stirring or other means. A carrier comprising an inert organic diluent or excess monomer can be employed. If desired, the monomer may be brought in the vapor phase into contact with the catalytic reaction product, in the presence or absence of liquid material. The polymerization zone can be maintained at temperatures and pressures that result in the formation of a solution of the polymer in a reaction medium. Agitation can be employed to obtain better temperature control and to maintain uniform polymerization mixtures throughout the polymerization zone. Adequate means can be utilized for dissipating the heat of polymerization.

Polymerization reactors suitable for the present disclosure can further comprise any combination of at least one raw material feed system, at least one feed system for catalyst or catalyst components, at least one recycle system, and/or at least one polymer recovery system. Suitable reactor systems for the present disclosure can further comprise systems for feedstock purification, catalyst storage and preparation, extrusion, reactor cooling, polymer recovery, fractionation, recycle, storage, load-out, laboratory analysis, process control, and/or other systems.

Conditions that can be controlled for polymerization efficiency and to provide desired resin properties include time, temperature, pressure and the concentrations of various reactants. Polymerization temperature can affect catalyst productivity, polymer molecular weight and molecular weight distribution. Suitable polymerization temperature can be any temperature below the de-polymerization temperature according to the Gibbs Free energy equation. Typically, the polymerization temperature includes temperatures in the range from about 60° C. to about 280° C., for example, and from about 70° C. to about 110° C., depending upon the type of polymerization reaction.

Suitable contact time of the components of the polymerization process can vary, as may be appropriate for a given process or product need or desire. In addition to contact time for the polymerization reaction itself, any/all times for pre-contacting, pre-activation, activation, aging, conditioning, or other process relating to the polymerization step can be varied, as may be necessary or desired to achieve an appropriate outcome.

Suitable pressures will also vary according to the reactor and polymerization type. The pressure for liquid phase polymerizations in a loop reactor is typically less than about 1000 psi (6.89 MPa). Pressure for gas phase polymerization is usually at about 200 to about 500 psi (1.38 to 3.45 MPa). High pressure polymerization in tubular or autoclave reactors is generally operated at about 20,000 psi to about 75,000 psi (137.90 to 517.11 MPa). Polymerization reactors can also be operated in a supercritical region occurring at generally higher temperatures and pressures. Operation above the critical point of a pressure/temperature diagram (supercritical phase) may offer advantages. In an embodiment, polymerization can occur in an environment having a suitable combination of temperature and pressure. For example, polymerization can occur at a pressure in a range from about 425 psi (2.93 MPa) to about 900 psi (6.21 MPa), alternatively, about 450 psi (3.10 MPa) to about 675 psi (4.65 MPa), and a temperature in a range from about 60° C. to about 280° C., alternatively, from about 70° C. to about 110° C.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, crack growth, long chain branching and rheological measurements.

The concentrations and/or partial pressures of monomer, co-monomer, hydrogen, co-catalyst, modifiers, and electron donors are important in producing these resin properties. Comonomer may be used to control product density. Hydrogen can be used to control product molecular weight. Co-catalysts can be used to alkylate, scavenge poisons and control molecular weight. Modifiers can be used to control product properties and electron donors affect stereoregularity, the molecular weight distribution, or molecular weight. In addition, the concentration of poisons is minimized because poisons impact the reactions and product properties.

In an embodiment, polymerizing monomers of the purified feed can comprise introducing a suitable catalyst system into the reactor 104, so as to form a slurry. Alternatively, a suitable catalyst system may reside in the reactor 104.

As explained above, polymerizing monomers of the purified feed can comprise selectively manipulating one or more polymerization reaction conditions to yield a given polymer product, to yield a polymer product having one or more desirable properties, to achieve a desired efficiency, to achieve a desired yield, the like, or combinations thereof. Non-limiting examples of such parameters include time, temperature, pressure, type and/or quantity of catalyst or co-catalyst, the concentrations and/or partial pressures of various reactants, or other process parameters. In an embodiment, polymerizing monomers of the purified feed 103 can comprise adjusting one or more polymerization reaction conditions.

In an embodiment, polymerizing monomers of the purified feed can comprise maintaining a suitable temperature, pressure, and/or partial pressure(s) during the polymerization reaction, alternatively, cycling between a series of suitable temperatures, pressures, and/or partials pressure(s) during the polymerization reaction.

In an embodiment, polymerizing monomers of the purified feed can comprise circulating, flowing, cycling, mixing, agitating, or combinations thereof, the monomers, catalyst system, and/or the slurry within reactor 104. In an embodiment where the monomers, catalyst system, and/or slurry are circulated, circulation can be at a velocity (e.g., fluid velocity) of from about 1 m/s to about 30 m/s (3.2 ft/s to 99 ft/s), alternatively, from about 2 m/s to about 17 m/s (6.5 ft/s to 56 ft/s), alternatively, from about 3 m/s to about 15 m/s (9.8 ft/s to 49 ft/s).

In an embodiment, polymerizing monomers of the purified feed can comprise configuring reactor 104 to yield a multimodal (e.g., a bimodal) polymer (e.g., polyethylene). For example, the resultant polymer can comprise both a relatively high molecular weight, low density (HMWLD) polyethylene polymer and a relatively low molecular weight, high density (LMWHD) polyethylene polymer. In the embodiment illustrated in FIG. 1, polymerizing monomers of the purified feed in reactor 104 can yield an effluent stream 110, which can generally comprise various solids, semi-solids, volatile and nonvolatile liquids, gases and/or combinations thereof. For example, effluent stream 110 can comprise unreacted reactant monomers (e.g., unreacted ethylene monomers) liquids, diluents, waste products, other gases, and/or contaminants. In an embodiment, effluent stream 110 can comprise hydrogen, nitrogen, methane, ethylene, ethane, propylene, propane, butane, isobutane, pentane, hexane, hexene-1 and heavier hydrocarbons and polymer product (e.g., polyethylene). In an embodiment, ethylene can be present in a range of from about 0.1% to about 15%, alternatively, from about 1.0% to about 10%, by weight. Ethane can be present in a range of from about 0.001% to about 4%, alternatively, from about 0.2% to about 2% by weight. Isobutane can be present in a range from about 70% to about 99%, alternatively, from about 80% to about 98%, alternatively, about 83% to about 97% by weight. The solids and/or liquids can comprise a polymer product (e.g., a polyethylene polymer), often referred to at this stage of PEP process 100 as "polymer fluff", or simply "fluff."

In an embodiment, heat can be added to effluent stream 110. For example, energy (e.g. heat) can be added to effluent stream 110 to facilitate processing (separation of the components of effluent stream 110, as will be discussed herein). In an embodiment, heating the effluent stream can be accomplished by any suitable device, apparatus, or process as will yield component states and/or phases, increases in effluent stream temperature, or combinations thereof as may be desired for a given application. In the embodiment of FIG. 1, heating effluent stream 110 may comprise routing the effluent stream 110 through a suitable heater, for example, flash-line heater 120. As used herein, the term "flash-line heater" can refer to a device or apparatus configured and arranged to add heat to a stream (e.g., effluent stream 110, which may comprise solids, liquids, and/or gases). Suitable flash-line heaters as can be employed herein are disclosed, for example, in U.S. Pat. Nos. 3,152,872; 5,183,866; and 5,207,929, each of which is incorporated herein in its entirety. An example of a suitable flash-line heater is a heat exchanger. Such a heat exchanger can comprise a double-walled pipe in which the substance to be heated (e.g., effluent stream 110) flows through an inner pipe while steam is injected in an outer or surrounding pipe. In an embodiment, the flash-line heater can operate intermittently. Generally, the volume of material flowing through a heat exchanger and the speed at which it flows determine the amount of heat that will be added. In an embodiment, heating effluent stream 110 can yield a heated effluent stream 125.

In an alternative embodiment, heat is not added to effluent stream 110. For example, in an embodiment, the polymerization reaction can occur at temperatures, pressures, and/or other operating parameters that provide sufficient energy to make unnecessary the addition of heat or energy to the effluent stream.

In an embodiment, heated effluent stream 125 (alternatively, in an embodiment where the effluent stream has not been heated, stream 110) can be separated into a polymer product stream and a flash gas stream. In an embodiment, separating heated effluent stream 125 into a polymer product stream and a flash gas stream can be achieved by any suitable device, apparatus, process, or series of processes. For example, in an embodiment, separating an effluent stream (such as heated effluent stream 125 or stream 110) into a polymer product stream and a flash gas effluent stream can comprise flashing the effluent stream in flash chamber 130. Not intending to be bound by theory, "flashing" a stream generally refers to causing a phase change in which liquid phase components of a stream (e.g., heated effluent stream 125) are converted into gas phase components (e.g. vaporizing/gasifying the liquid components of the stream), for example, as by a reduction of the pressure of the stream. In an embodiment, flashing can be accomplished by adding heat to a stream, reducing the pressure of the stream, adding other forms of energy to the stream (e.g. ultrasonic energy), or combinations thereof. For example, flashing a stream can comprise rapidly (e.g., instantaneously or nearly instantaneously) allowing the volume of the stream to increase such that the pressure of the stream falls and the liquid components of the stream enter a vapor or gas phase. As such, a stream that has been flashed can comprise gaseous phase components (e.g., the flash gas) and solid phase components (e.g., the polymer product). For example, in an embodiment substantially all (e.g., at least about 98%, alternatively about 99%, alternatively about 99.5%, alternatively about 99.9% by total weight) of the non-polymer components (e.g., liquids and gases) present in stream 125 are recovered as gases via stream 145. Solid polymer product is recovered via stream 135.

In one embodiment, the solid phase components (stream 135) can be sufficiently segregated from the gaseous components (stream 145) upon flashing (e.g., vaporization) of the stream and without the need to subject the solid phase components and the gaseous components to any further separation process. For example, the solid materials that had been entrained within the stream can "fall out" when the liquid components of the stream undergo a phase change to vapor.

In the embodiment of FIG. 1, separating the heated effluent stream comprises routing heated effluent stream 125 into flash chamber 130. Flash chamber 130 can comprise a single vessel or multiple vessels, as suitable, and can comprise additional flash compartments or chambers, flush/surge chambers, various valves, inlets, outlets, or other suitable equipment. Not seeking to be bound by theory, as heated effluent stream 125 is introduced into flash chamber 130, the volume of the stream entering flash chamber 130 can expand rapidly, resulting in a decrease in the pressure of the stream and the vaporization of the liquid components of the heated effluent stream 125. As such, in an embodiment, introduction of the heated effluent stream 125 into the flash chamber 130 (e.g., flashing the heated effluent stream 125) can yield solid components (e.g., polymer product or polymer fluff) and gaseous or vaporous components (e.g., flash gases). Also in the embodiment of FIG. 1, any remaining polymer product in stream 145 can be further segregated from the flash gases by subsequent separation steps.

In the embodiment of FIG. 1, the solid components of heated effluent stream 125 can exit flash chamber 130 as a polymer product stream 135, and the gaseous or vaporous components exit as flash gas effluent stream 145. In an embodiment, polymer product stream 135 can comprise polymer fluff comprising oligomers and/or larger polymers, as produced in the polymerization reaction or reactions described previously (e.g., polyethylene). In an embodiment, flash gas effluent stream 145 can comprise the nonsolid components of reactor effluent stream 110 in the vapor phase (e.g., hydrogen, nitrogen, methane, ethylene, ethane, propylene, propane, butane, isobutane, pentane, hexane, hexene-1 and heavier hydrocarbons), as well as fine particles of solid polymer that are not separated by the flash chamber 130.

In an embodiment, flash gas effluent stream 145 can exit flash chamber 130 at a suitable pressure. For example, the pressure of flash gas effluent stream 145 as it exits flash chamber 130 can be within a pressure range of from about 14.7 psi (0.101 MPa) to about 527.9 psi (3.64 MPa), alternatively, from about 15.7 psi (0.108 MPa) to about 348 psi (2.40 MPa), alternatively, from about 85 psi (0.586 MPa) to about 290 psi (2.00 MPa).

In an alternative embodiment, separating heated effluent stream 125 (alternatively, in an embodiment where the effluent stream has not been heated, effluent stream 110) into a polymer product stream 135 and a gaseous stream (e.g. flash gas effluent stream 145) may occur by filtration, membrane separation, various forms of centrifugal separation, or other suitable device, apparatus, or process of separation as will be appreciated by one of ordinary skill in the art with the aid of this disclosure.

In an embodiment of FIG. 1, flash gas effluent stream 145 exiting flash chamber 130 can comprise polymer fines comprising oligomer and/or larger polymers, as produced in the polymerization reaction or reactions described previously (e.g., polyethylene). These fines are smaller in size than the polymer product or polymer fluff found in streams 125 and 135, and can be smaller than 10 microns, alternatively smaller than 5 microns, or alternatively smaller than 2 microns.

In an embodiment, separating an effluent stream (e.g., heated effluent stream 125) into a polymer product stream and a flash gas stream can generally comprise further segregating the gas phase components (e.g. the flash gas effluent stream) from the solid phase components (e.g. polymer fines). Further segregating the gas phase components and the solid phase components can be achieved by any suitable device, apparatus, or process. For example, in an embodiment where a stream has been flashed, any solid phase components (e.g., polymer fines) remaining in the vapor phase and the vapor phase components (e.g., the flash gas effluent) can be further separated by cyclonic separation. Generally speaking, cyclonic or vortex separation refers to a method of separating solid, and/or particulate materials from gaseous materials, for example, via a high speed rotating flow established within a cylindrical or conical container (e.g., a cyclonic chamber or cyclone). Material flows in a spiral pattern, beginning at the top (wide end) of the cyclone and ending at the bottom (narrow) end before exiting the cyclone. Not intending to be bound by theory, solid and/or particulate material (e.g. the polymer fluff) entrained within a rotating, gaseous stream within the cyclone have too much inertia to follow the tight curve of the rotating, gaseous stream and, thus, strike the outside wall of the cyclone, and fall toward the bottom of the cyclone. In such a conical system, as the rotation flow moves towards the narrow end of the cyclone the rotational radius of the stream is reduced, separating smaller and smaller particles. The cyclone geometry, together with flow rate, defines the "cut point" of the cyclone; that is, the size of particle that will be removed from the stream with 50% efficiency. Generally, particles having a size larger than the cut point will be removed with a greater efficiency, and smaller particles will be removed with a lower efficiency.

As illustrated generally in FIG. 1, and in accordance with an aspect of the present disclosure, the gas exiting flash gas chamber 130, flash gas effluent stream 145, enters cylindrical or conical clamber 140 (e.g., a cyclone) tangentially at one or more points and leaves through a central opening. The particles, by virtue of their inertia, will tend to move toward the outside separator wall, from which they are led into a receiver. The gas, stream 165, exits at a top portion of the cyclone, and the solids, stream 155, exit at a bottom portion of the cyclone. The cyclone can be operated at a pressure and temperature similar to those used for high pressure flash chambers.

By way of further example, the cyclone can be operated at the pressures and temperatures typically employed for an intermediate pressure flash chamber, for example, the intermediate pressure flash chamber of a two-stage flash system as set forth by Hanson, el al. in U.S. Pat. No. 4,424,341, which is incorporated by reference herein. Preferably, the cyclone or cyclonic zone is operated at a pressure within the range of from about 100 psi to about 1500 psi (0.69 MPa to 10.34 MPa), alternatively from about 125 psi to about 275 psi (0.86 MPa to 1.90 MPa), alternatively from about 150 to about 250 psi (1.03 MPa to 1.72 MPa), alternatively from about 140 psi to about 190 psi (0.91 MPa to 1.31 MPa), alternatively about 170 psi (1.17 MPa). The cyclone or cyclonic zone can be operated at a temperature within the range of from about 37.8° C. to about 121° C., alternatively from about 54.4° C. to about 110° C., alternatively from about 65.6° C. to about 98.9° C., alternatively from about 76.6° C. to about 93.3° C.

In an aspect of the present disclosure, at least about 90% of the polymer solids can be separated from the gaseous medium in the cyclone. Alternatively, at least about 95% of the polymer solids can be separated from the gaseous medium in the cyclone. Alternatively, at least about 99% of the polymer solids can be separated from the gaseous medium in the cyclone. Alternatively, at least about 99.9% of the polymer solids can be separated from the gaseous medium in the cyclone. The solids separation efficiency can be very high (about 99.99% or higher, for example about 99.999%), but the efficiency depends in part on particle size distribution.

In a further aspect of the instant disclosure, separated flash gas effluent stream 165 exiting the cyclone can contain less than about 5% by weight fine polymer particles, alternatively less than about 1% by weight fine polymer particles, alternatively less than about 0.1% by weight fine polymer particles, alternatively less than about 0.01% by weight fine polymer particles, alternatively less than about 0.001% by weight fine polymer particles.

In an alternative aspect of the disclosure, separating heated effluent stream 125 (alternatively, in an embodiment where effluent stream 110 has not been heated) into a polymer product stream and a gaseous stream can be accomplished using any combination of a flash chamber, a cyclone, a filtration unit, and any other suitable separation devices. As will be appreciated by one of ordinary skill in the art, the purpose of using two or more separation devices in series is to effectively remove polymer particles of varying sizes (i.e., a filtration unit or a cyclone can more efficiently remove polymer fines than a flash chamber).

With continued reference to the general block diagram of FIG. 1, flash gas effluent stream 145 (or alternatively, separated flash gas effluent stream 165), which comprises polymer fines, can be passed through one or more subsequent separation devices 140 and 150 to remove the polymer fines. Suitable separation devices for removing polymer fines include cyclones, tangential flow filters, membrane filters, bag filters, electrostatic separators, and the like.

Figure 2:
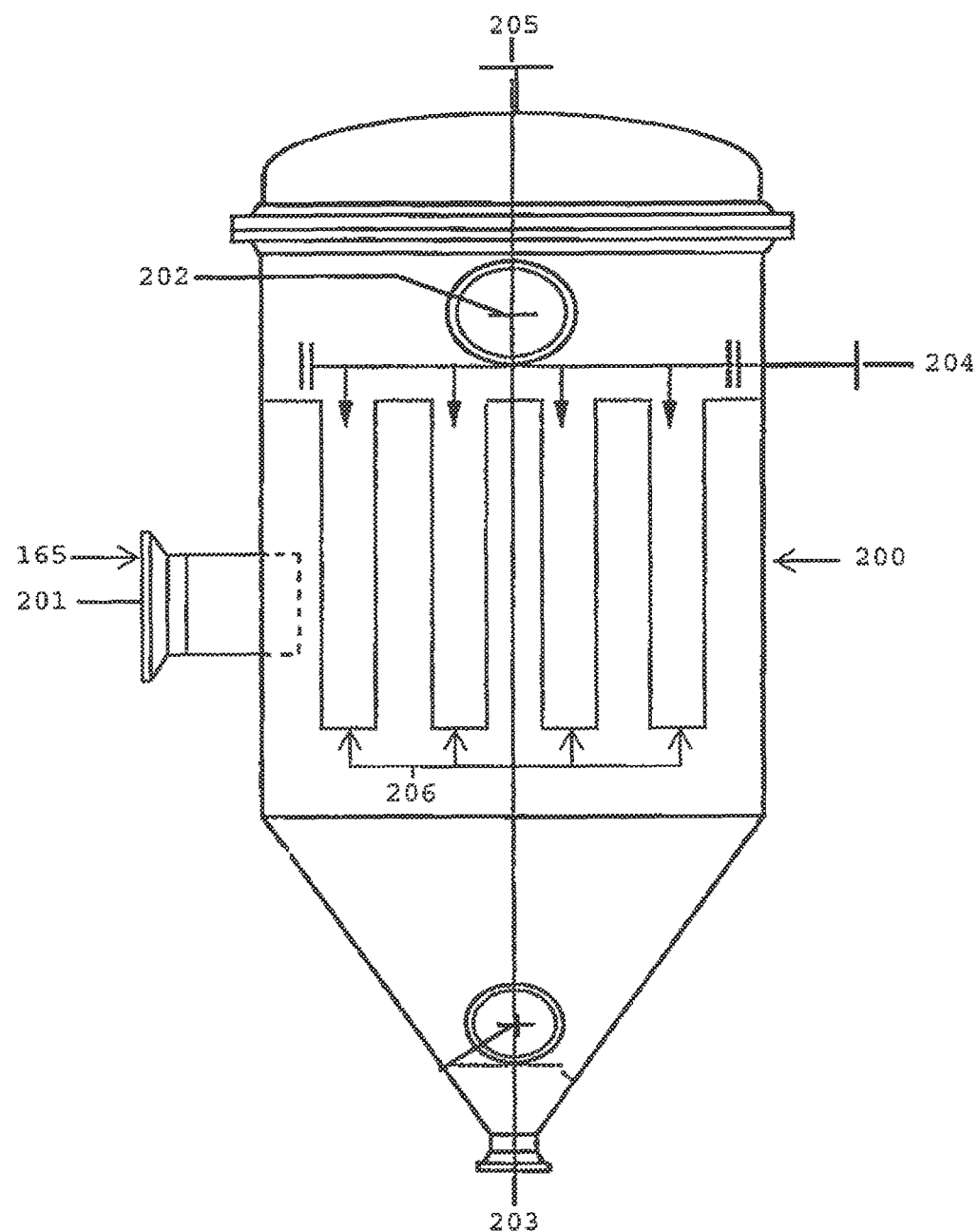
FIG. 2 illustrates the main components of a bag filter apparatus, according to an embodiment of the disclosure.

In an embodiment, polymer fines and powder are removed from flash gas effluent stream 145 using a cyclone, such as flash gas cyclone 140, and a bag filter system 150 arranged in series. In accordance with the present disclosure, bag filter system 150 includes (but is not limited to) a cone-bottom vessel (or housing), as will be discussed subsequently in reference to the illustration of vessel 200 in FIG. 2, in which fabric filters 206, also referred to generally as "bags," are hanging. Also known as bag house fillers, as shown in FIG. 2, gas flows into the vessel via gas inlet 201 and through multiple bags (or bag filters) 206 hanging in parallel inside of the vessel (or housing).

There are multiple ways to configure the bags in the vessel (or housing), multiple ways of flowing air through the bags, and multiple types of fabrics that can be used to construct the bags. The bag filter system 150 can be a reverse-air, a shaker, or a pulse-jet system. A well-designed bag filter system collects particles ranging from submicron sizes to particles that are several hundred microns in diameter at efficiencies greater than 99%. Bag filter design involves optimizing the filtering velocity to balance the bag house size with the pressure drop. Filtering velocity is typically in the range of from about 2 ft/min to about 4 ft/min (about 0.6 m/min to about 1.2 m/min); however, it should be adjusted to account for specific design cases based on particle loading, particle size, and other factors.

Fabric selection must be based on the characteristics of the gas stream (e.g., temperature and chemical composition) as well as the type of particulates to be removed. Common fabrics used in bag filters include but are not limited to acrylic acid copolymers, e.g., those which are sold under the trade name Dynel®, cotton, wool, nylon, polypropylene, polycarbonates, polysulphones, orlon dacron, polyamides of the polyhexamethyleneadipamide type, or polyamides known by the general name "Nylon", such as Nomex®, polytetrafluoroethylene (e.g. Teflon®), copolymers such as styrene/acrylic acid copolymers and the like, and glass fiber fabric or felt materials, among others. The bag filter housing may be subdivided into multiple compartments, depending on the total gas flow rate, the available or desired maximum allowable pressure drop, the amount of required filtration area, and the filtration time.

Over time, particles build up on the surface of the bag filters which will cause the pressure drop across the system to increase. When the pressure drop reaches a value that is not acceptable for continued operation of the system, the bags must be cleaned. In a reverse-air system, clean air (or other gas) is blown through the bags in the direction opposite to the normal flow of gas. In a shaker system, the bags are physically shaken to dislodge particles from the filters. In a pulse-jet system, bags are cleaned by short blasts of high pressure air (or other gas) that occur every few minutes.

In an embodiment, the overhead vapor in separated flash gas effluent stream 165 enters bag filter system 150 at a point just above the start of the conical section of vessel 200, e.g., at point 201, rises and passes through the filter bags (206), and exits the top of the bag filter vessel (or housing). In an embodiment depicted in FIG. 2, gas enters at flash gas inlet 201. In an embodiment, a vapor stream (such as that described by separated flash gas effluent stream 165 of FIG. 1) enters vessel (or housing) 201 via a nozzle that is tangential to the wall of the vessel. As the vapor stream flows up through the bags 206 and out of the vessel (or housing) through vapor outlet 202, any solids in the vapor stream, including polymer fines and/or powder, are trapped on the interior surface of the bags. Depending on the size of the housing and volume of gas being processed, the bag filter housing 200 may include hundreds of filter bags 206.

In an embodiment the bag filter vessel 200 (or housing) is connected to a bag filter blowback system which uses air, nitrogen, or other process gas to pulse gas into the bags, thereby removing any fines collected on the outside of the bag. This bag filter blowback system is used to clean the bag filters if an abnormal or unacceptable pressure drop is observed. In the embodiment depicted by FIG. 2, ethylene gas enters the vessel through blow back inlet 204. In an embodiment, the polymer particles are removed from the bag filter in stream 175 in FIG. 1 via solids outlet 203 in FIG. 2. In an embodiment, the substantially particle-free reactor effluent gas stream 185 that leaves bag filter system 150 in FIG. 1 does so via vapor outlet 202 as shown in FIG. 2. The substantially particle-free effluent gas is subsequently subjected to further processing steps, that can include but not limited to, a guard filter, a compressor, and one or more distillation columns, to separate the various individual components in the gas stream.

In an embodiment, reactor effluent gas stream 185 that leaves bag filter system 150 is substantially particle-free. Specifically, reactor effluent gas stream 185 contains less than about 1% (10,000 ppm) by weight; less than about 0.5% (5,000 ppm) by weight, less than about 0.1% (1,000 ppm) by weight; less than about 0.01% (100 ppm) by weight, less than about 0.001% (10 ppm) by weight, or less than about 0.0001% (1 ppm) by weight solid particles.

In an embodiment, separated flash gas effluent stream 165 that enters bag filter system 150 has an actual flow rate of greater than about 50,000 ft$^3$/h (1,400 m$^3$/h); alternatively, an actual flow rate of about 50,000 ft$^3$/h to about 100,000 ft$^3$/h (1,400 m$^3$/h to 2,800 m$^3$/h); alternatively, an actual flow rate of about 100,000 ft$^3$/h to about 150,000 ft$^3$/h (2,800 m$^3$/h to 4,250 m$^3$/h). In an embodiment, separated flash gas effluent stream 165 that enters bag filter system 150 has a flow rate at standard conditions of greater than about 10,000 ft$^3$/min; alternatively, a flow rate at standard conditions of about 15,000 scf/min to about 20,000 scf/min; alternatively, a flow rate at standard conditions of about 20,000 scf/min to about 30,000 scf/min. In an embodiment, the flow rate of solids entering bag filter system 150 is greater than about 10 lb/hour (4.5 kg/h); alternatively, greater than about 50 lb/hr (22.7 kg/h); alternatively, greater than about 100 lb/hour (45.5 kg/h); alternatively, less than about 150 lb/hour (68.0 kg/h). In an embodiment, the particle size of the solids entering bag filter system 150 can be greater than about one micron; alternatively, greater than about 5 microns; alternatively, greater than about 10 microns, alternatively, greater than about 25 microns; alternatively, greater than about 50 microns.

In an embodiment, bag filter system 150 operates at a temperature greater than about 37° C.; alternatively, at a temperature greater than about 65° C.; alternatively, a temperature greater than about 79° C.; alternatively, a temperature greater than 93° C.; alternatively, a temperature less than about 150° C. In an embodiment, bag filter system 150 operates at a pressure greater than about 100 psi (0.69 MPa); alternatively, a pressure greater than about 125 psi (0.86 MPa); alternatively, a pressure greater than about 150 psi (1.03 MPa); alternatively, a pressure less than about 350 psi (2.41 MPa).

In a preferred embodiment, bag filter system 150 operates with an actual flow rate of gas of from about 126,328 ft$^3$/h (3,577 m$^3$/hr) to about 138,961 ft$^3$/h (3,935 m$^3$/h) at a temperature of about 180° F. (82° C.) and a pressure of about 135 psi (gauge) (0.93 MPag). In a preferred embodiment, bag filter system 150 operates with a flow rate at standard conditions of from about 20,376 scf/min to about 22,414 scf/min. In a preferred embodiment, the flow rate of solids in the gas stream entering bag filter system 150 is about 100 lb/h (45.4 kg/h).

In an embodiment, the bag filter system 150 is a reverse pulse-jet system. In an embodiment, the blow back gas is a dry gas. In a preferred embodiment, the blow back gas is ethylene. In a preferred embodiment, the blow back gas is ethylene above the dew point temperature.

In an embodiment, the bag filter system 150 operates at an efficiency greater than about 95% for particles 2 microns in size. In an embodiment, the bag filter system operates at an efficiency greater than about 99% for particles 2 microns in size. In a preferred embodiment, the bag filter system operates at an efficiency greater than or equal to about 99.8% for particles 2 microns in size.

In preferred embodiment the filter media is a porous polytetrafluoroethylene (PTFE or Teflon®) felt, such as a filamentary PTFE felt material. Alternatively, in an embodiment the filter media is comprised of polyester or polypropylene fibers. In an alternative preferred embodiment, the filter media also comprises a PTFE membrane.

In an embodiment, the diameter of each of the filter bags can be from about 115 mm to about 150 mm (about 4.5 inches to about 5.9 inches), and the length of each of the bags can be from about 1550 mm to about 3000 mm (about 5.0 feet to about 10.0 ft). In an embodiment, the length of each of the filter bags is less than or equal to about 2240 mm (7.35 ft). In an alternative embodiment, the length of each of the filter bags is less than about 2000 mm (6.6 ft).

The term "can velocity" as used herein is defined as the vertical velocity of the gas in the open area between the bags, and this velocity must be low enough to allow for polymer fines to fall to the bottom of the filter housing. Can velocity is calculated by dividing the gas flow rate by the cross sectional area of the bag filter housing minus the cross sectional area of the filter media in the housing. In an embodiment, the can velocity is between from about 0.4 m/s to about 0.6 m/s (1.3 ft/s to 2 ft/s). In an embodiment, the can velocity is between from about 0.3 m/s to about 0.6 m/s (0.98 ft/s to 2 ft/s). In an embodiment, the can velocity is less than or equal to about 0.3 m/s (0.98 ft/s). In a preferred embodiment, the can velocity is less than about 1 ft/s (0.3 m/s).

The air-to-cloth ratio is defined as the ratio of the actual gas flow rate per bag surface area. In an embodiment, the air-to-cloth ratio is from about 0.8 m$^3$/min to about 1.1 m$^3$/min gas per m$^2$ of bag surface area. In an embodiment, the air-to-cloth ratio is from about 0.6 m$^3$/min to about 1.1 m$^3$/min gas per m$^2$ of bag surface area. In an embodiment, the air-to-cloth ratio is less than or equal to about 0.8 m$^3$/min gas per m$^2$ of bag surface area. In a preferred embodiment, the air-to-cloth ratio is less than about 0.043 ft$^3$/s gas per ft$^2$ of bag surface area (0.79 m$^3$/min gas per m$^2$).

In an embodiment, the system to remove solid polymer particles consists of a flash chamber 130, a flash gas cyclone 140, and a bag filter system 150. In this embodiment, heated effluent stream 125 (or optionally, unheated effluent stream 110) enters directly into flash chamber 130. In an alternative embodiment, the system to remove solid polymer particles consists of a flash chamber 130 and a bag filter system 150. In this embodiment, flash gas stream 145 enters directly into a bag filter system 150. In yet another alternative embodiment, the system consists of a flash gas cyclone 140 and a bag filter system 150 to remove solid polymer particles. In this embodiment, heated effluent stream 125 (or optionally, unheated effluent stream 110) enters directly into flash gas cyclone 140.

In an embodiment, the gas leaving the bag filter, substantially particle-free reactor effluent stream 185, is sent to a guard filter 160 and then to a flash compressor 170. The compressed gas is subsequently separated into lighter and heavier components via one or more downstream distillation towers as represented by unit operation 180, and following separation, is used as recycle (e.g. make-up) gas feed to the reactor system. In FIG. 1, all equipment downstream of the compressor is represented by unit operation 180.

In an embodiment, overall system robustness can be a benefit of the systems and/or processes disclosed herein, and may be accompanied by the related capital and/or operating overhead reductions associated therewith. For example, such overall system robustness may be the result of removing solid polymer particles that, if left in the system, can cause plugging and fouling, which will subsequently cause equipment malfunction and process down-time for equipment cleaning and repairs. While the present disclosure has been illustrated and described in terms of a particular process and methods of use, it is apparent that equivalent techniques, components and constituents may be substituted for those shown, and other changes can be made within the scope of the present disclosure as defined by the appended claims.

EXAMPLES

The disclosure having been generally described, the following examples are included to demonstrate preferred embodiments of the inventions. It should be appreciated by those of skill in the art that the techniques disclosed in the examples which follow represent techniques discovered by the inventors to function well in the practice of the inventions, and thus can be considered to constitute preferred modes for its practice. However, those of skill in the art should, in light of the present disclosure, appreciate that many changes can be made in the specific embodiments which are disclosed and still obtain a like or similar result without departing from the scope of the inventions.

Prophetic Example 1

To demonstrate the operation of the systems and/or processes disclosed herein, design calculations were performed to determine the appropriate size of a bag filter system given a specified range of gas flow rates and operating conditions. The design calculations are readily known to one of ordinary skill in the art of separations equipment design.

For an actual flash gas flow rate of 126,328 ft$^3$/h (normal) up to 138,961 ft$^3$/h (maximum) at the bag filter inlet at an operating temperature of 180° F. and 135 psi (gauge), the flash gas has the following properties:

TABLE 1

Properties of Flash Gas Feed Stream to Bag Filter System

| | | |
|---|---|---|
| Gas Flow Rate at Standard Conditions (scf/min) | 20,376 | 22,414 |
| Gas Density, Actual (lb/ft$^3$) | 1.385 | 1.385 |
| Gas Molecular Weight (lb/lb$_{mol}$) | 54.3 | 54.3 |
| Gas Viscosity (cP) | 0.01 | 0.01 |
| Solids Flow (lb/h) | 100 | 100 |

The composition of the flash gas stream entering the bag filter system is as follows:

TABLE 2

Composition of Flash Gas Feed Stream to Bag Filter System

| Component | lb/hr | Wt. % | Mol % |
|---|---|---|---|
| Hydrogen | 1.00 | 0.00 | 0.02 |
| Nitrogen | 5.45 | 0.00 | 0.01 |
| Oxygen | 0.13 | 0.00 | 0.00 |
| Methane | 46.59 | 0.03 | 0.09 |
| Ethylene | 10974.96 | 6.27 | 12.15 |
| Ethane | 590.50 | 0.34 | 0.61 |
| Propene | 27.70 | 0.02 | 0.02 |
| Propane | 71.57 | 0.04 | 0.05 |
| 1-Butane | 160419.00 | 91.71 | 85.73 |
| N-Butane | 1816.90 | 1.04 | 0.97 |
| Hexene | 936.01 | 0.54 | 0.35 |
| Hexane | 35.97 | 0.02 | 0.01 |

The particle size distribution in the flash gas stream entering the bag filter system is as follows:

TABLE 3

Particle Size Distribution of Flash Gas Feed Stream to Bag Filter System

| Size (microns) | Weight % |
|---|---|
| 74 | 0.313 |
| 53 | 0.625 |
| 44 | 5.000 |
| 30 | 20.000 |
| 20 | 17.500 |
| 10 | 45.00 |
| 5 | 7.813 |
| 2 | 3.750 |

Under these conditions, the efficiency of the bag filter system is expected to be 99.8% at 2 microns. The allowable pressure drop under clean conditions is 1.5 psi, and the allowable pressure drop under dirty conditions is 3.0 psi. The allowable air flow to cloth area ratio is 0.043 ft$^3$/s per ft$^2$ of bag surface area at actual conditions, and the can velocity is less than 1 ft/s.

Prophetic Example 2

For an actual flash gas flow rate of 86,191 ft$^3$/h (normal) up to 94,810 ft$^3$/h (maximum) at the bag filter inlet at an operating temperature of 175° F. and 154 psi (gauge), the flash gas has the following properties:

TABLE 4

Properties of Flash Gas Feed Stream to Bag Filter System

| | | |
|---|---|---|
| Gas Flow Rate at Standard Conditions (scf/min) | 16,587 | 18,246 |
| Gas Density, Actual (lb/ft$^3$) | 1.7 | 1.7 |
| Gas Molecular Weight (lb/lb$_{mol}$) | 55.8 | 55.8 |
| Gas Viscosity (cP) | 0.01 | 0.01 |
| Solids Flow (lb/h) | 102 | 102 |

The composition of the flash gas stream entering the bag filter system is as follows:

TABLE 5

Composition of Flash Gas Feed Stream to Bag Filter System

| Component | lb/hr | Wt. % | Mol % |
|---|---|---|---|
| Hydrogen | 31.73 | 0.02 | 0.60 |
| Nitrogen | 9.92 | 0.01 | 0.01 |
| Oxygen | 1.23 | 0.00 | 0.00 |
| Methane | 55.78 | 0.04 | 0.13 |
| Ethylene | 5265.54 | 3.59 | 7.16 |
| Ethane | 947.21 | 0.65 | 1.2 |
| Propene | 28.35 | 0.02 | 0.03 |
| Propane | 90.15 | 0.06 | 0.08 |
| 1-Butane | 133242.00 | 90.94 | 87.42 |
| N-Butane | 1398.50 | 0.95 | 0.92 |
| Hexene | 5132.41 | 3.5 | 2.33 |
| Hexane | 167.69 | 0.11 | 0.07 |
| Oligomer | 134.72 | 0.09 | 0.04 |
| Water | 5.31 | 0.00 | 0.01 |

The particle size distribution in the flash gas stream entering the bag filter system is as follows:

TABLE 6

Particle Size Distribution of Flash Gas Feed Stream to Bag Filter System

| Size (microns) | Weight % |
|---|---|
| 74 | 0.313 |
| 53 | 0.625 |
| 44 | 5.000 |
| 30 | 20.000 |
| 20 | 17.500 |
| 10 | 45.00 |
| 5 | 7.813 |
| 2 | 3.750 |

Under these conditions, the efficiency of the bag filter system is expected to be 99.8% at 2 microns. The allowable pressure drop under clean conditions is 1.5 psi, and the allowable pressure drop under dirty conditions is 3.0 psi. The allowable air flow to cloth area ratio is 0.043 ft$^3$/s per ft$^2$ of bag surface area at actual conditions, and the can velocity is less than 1 ft/s.

ADDITIONAL DISCLOSURE

The following are nonlimiting, specific embodiments in accordance with the present disclosure:

Embodiment A

A process for removing solid polymer particles from a polymerization reactor effluent stream, the process comprising:
  recovering a reactor effluent stream from a polymerization reactor;
  flashing the reactor effluent stream in a flash chamber to form a flash gas stream;
  separating the flash gas stream from the polymer particles within the stream by passing the flash gas stream through a flash gas cyclone; and
  further separating the flash gas stream from fine polymer particles by passing the flash gas stream through a bag filter system;
  wherein the bag filter system is operated with a can velocity of less than or equal to about 0.30 m/s (1 ft/s) and an air-to-cloth ratio of less than or equal to about 1.1 m$^3$/min per m$^2$ (0.060 ft$^3$/s per ft$^2$) of bag surface area.

Embodiment B

The process of Embodiment A, wherein the bag filter system comprises one or more bag filters.

Embodiment C

The process of Embodiment B, wherein the bag filters are made of polytetrafluoroethylene.

Embodiment D

The process of Embodiment B, wherein the bag filters are each equal to or less than about 2240 mm (7.35 ft) in length.

Embodiment E

The process of any one of the preceding Embodiments wherein the flash gas stream entering the bag filter system has an actual flow rate ranging from about 100,000 ft³/hour to about 150,000 ft³/hour at a temperature of about 180° F. and a pressure of about 135 psi (gauge).

Embodiment F

The process of any one of the preceding Embodiments, wherein a flow rate of solids entering the bag filter system is less than about 150 lb/hour.

Embodiment G

The process of Embodiment A, wherein the air to cloth ratio is less than about 0.8 m³/min per m² (0.043 ft³/s per ft²) of bag surface area.

Embodiment H

The process of any one of the preceding Embodiments, wherein the bag filter system is operated at a temperature less than about 300° F. and a pressure less than about 350 psig.

Embodiment I

The process of any one of the preceding Embodiments, wherein the bag filter system operates at an efficiency of greater than about 99% for particles 2 microns in size.

Embodiment J

A process for removing solid polymer particles from a polymerization reactor effluent stream, the process comprising:
  recovering a reactor effluent stream from a polymerization reactor;
  flashing the reactor effluent stream in a flash chamber to form a flash gas stream; and
  further separating the flash gas stream from fine polymer particles by passing the flash gas stream through a bag filter system;
  wherein the bag filter system is operated with a can velocity of less than or equal to 0.30 m/sec (1 ft/s) and an air-to-cloth ratio of less than or equal to 1.1 m³/min per m² (0.060 ft³/s per ft²) of bag area.

Embodiment K

A process for removing solid polymer particles from a polymerization reactor effluent stream the process comprising:
  recovering a reactor effluent stream from a polymerization reactor,
  separating the reactor effluent from polymer particles by passing the reactor effluent through a flash gas cyclone; and
  further separating the reactor effluent stream from fine polymer particles by passing the reactor effluent stream through a bag filter system;
  wherein the bag filter system is operated with a can velocity of less than or equal to 0.30 m/s (1 ft/s) and an air-to-cloth ratio of less than or equal to 1.1 m³/min per m² (0.060 ft³/s per ft²) of bag area.

Embodiment L

A system for removing solid polymer particles from a polymerization reactor effluent stream, the system comprising:
  a polymerization reactor, a flash chamber, a flash gas cyclone, and a bag filter system;
  wherein the bag filter system is operated with a can velocity of less than or equal to about 0.30 m/sec (1 ft/s) and an air-to-cloth ratio of less than or equal to about 1.1 m³/min per m² (0.060 ft³/s per ft²) of bag surface area.

Embodiment M

The system of Embodiment L wherein the flash gas cyclone is located upstream of the bag filter system and the flash chamber is located upstream of the flash gas cyclone.

Embodiment N

A system for removing solid polymer particles from a polymerization reactor effluent stream, the system comprising:
  a polymerization reactor, optionally a flash chamber, further optionally a flash gas cyclone, and a bag filter system:
  wherein the bag filter system is operated with a can velocity of less than or equal to about 0.30 m/s (1 ft/s) and an air-to-cloth ratio of less than or equal to about 1.1 m³/min per m² (0.060 ft³/s per ft²) of bag surface area.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4; greater than 0.10 includes 0.11, 0.12, 0.13). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural or other details supplementary to the disclosure.

The invention claimed is:

1. A process for removing solid polymer particles from a polymerization reactor effluent stream, the process comprising:
recovering a reactor effluent stream from a polymerization reactor;
flashing the reactor effluent stream in a flash chamber to form a flash gas stream comprising fluid material and solid polymer particles;
separating the flash gas stream from the polymer particles within the stream by passing the flash gas stream through a cyclone to form a flash gas stream comprising less than 5 wt. % fine polymer particles; and
further separating the flash gas stream from the fine particle polymers by passing the flash gas stream through a bag filter system to generate a substantially solids-free flash gas stream;
wherein the bag filter system is operated with a can velocity of less than or equal to about 0.30 m/s (1 ft/s) and an air-to-cloth ratio of less than or equal to about 1.1 m$^3$/min per m$^2$ (0.060 ft$^3$/s per ft$^2$) of bag surface area.

2. The process of claim 1, wherein the bag filter system comprises one or more bag filters.

3. The process of claim 2, wherein the bag filters are made of polytetrafluoroethylene.

4. The process of claim 2, wherein the bag filters are each equal to or less than about 2240 mm (7.35 ft) in length.

5. The process of claim 1, wherein the flash gas stream entering the bag filter system has an actual flow rate ranging from about 100,000 ft/hour to about 150,000 ft/hour at an operating temperature of about 180° F. and a pressure of about 135 psi (gauge).

6. The process of claim 1, wherein a flow rate of solids entering the bag filter system is less than about 150 lb/hour.

7. The process of claim 1, wherein the air-to-cloth ratio is less than about 0.8 m$^3$/min per m$^2$ (0.043 ft$^3$/s per ft$^2$) of bag surface area.

8. The process of claim 1, wherein the bag filter system is operated at a temperature less than about 300° F. and a pressure less than about 350 psig.

9. The process of claim 1, wherein the bag filter system operates at an efficiency of greater than about 99% for particles 2 microns in size.

10. A process for removing solid polymer particles from a polymerization reactor effluent stream, the process comprising:
recovering the polymerization reactor effluent stream from a polymerization reactor;
flashing the reactor effluent stream in a flash chamber to form a flash gas stream comprising flash gas and fine polymer particles; and
further separating the flash gas in the flash gas stream from the fine polymer particles by passing the flash gas stream through a bag filter system;
wherein the bag filter system is operated with a can velocity of less than or equal to about 0.30 m/s (1 ft/s) and an air-to-cloth ratio of less than or equal to about 1.1 m$^3$/min per m$^2$ (0.060 ft$^3$/s per ft$^2$) of bag surface area.

11. A process for removing solid polymer particles from a polymerization reactor effluent stream comprising:
recovering the polymerization reactor effluent stream from a polymerization reactor;
separating the polymerization reactor effluent stream from fine polymer particles contained within the polymerization reactor effluent stream by passing the polymerization reactor effluent stream through a cyclone to form a reactor effluent stream comprising less than 5 wt. % fine polymer particles; and
further separating the reactor effluent stream from fine polymer particles contained therein by passing the reactor effluent stream through a bag filter system to form a substantially particle-free reactor effluent stream;
wherein the bag filter system is operated with a can velocity of less than or equal to about 0.30 m/s (1 ft/s) and an air-to-cloth ratio of less than or equal to about 1.1 m$^3$/min per m$^2$ (0.060 ft$^3$/s per ft$^2$) of bag surface area.

12. A system for removing solid polymer particles from a polymerization reactor effluent stream, the system comprising:
a polymerization reactor, a flash chamber, a cyclone and a bag filter system;
wherein the bag filter system is operated with a can velocity of less than or equal to about 0.30 m/s (1 ft/s) and an air-to-cloth ratio of less than or equal to about 1.1 m$^3$/min per m$^2$ (0.060 ft$^3$/s per ft$^2$) of bag surface area.

13. The system of claim 12, wherein the cyclone is a flash gas cyclone.

14. A system for removing solid polymer particles from a polymerization reactor effluent stream, the system comprising:
a polymerization reactor, optionally a flash chamber, further optionally a cyclone, and a bag filter system;
wherein the bag filter system is operated with a can velocity of less than or equal to about 0.30 m/s (1 ft/s) and an air-to-cloth ratio of less than or equal to about 1.1 m$^3$/min per m$^2$ (0.060 ft$^3$/s per ft$^2$) of bag surface area.

* * * * *

UNITED STATES PATENT AND TRADEMARK OFFICE
CERTIFICATE OF CORRECTION

| | |
|---|---|
| PATENT NO. | : 10,435,488 B2 |
| APPLICATION NO. | : 15/947943 |
| DATED | : October 8, 2019 |
| INVENTOR(S) | : Bryan M. Garner |

Page 1 of 1

It is certified that error appears in the above-identified patent and that said Letters Patent is hereby corrected as shown below:

In the Claims

Claim 5, Column 21, Line 53, please change "100,000 ft/hour" to -- 100,000 ft3/hour -- and please change "150,000 ft/hour" to -- 150,000 ft3/hour --

Signed and Sealed this
Fifth Day of May, 2020

Andrei Iancu
*Director of the United States Patent and Trademark Office*